(12) United States Patent
Kamm et al.

(10) Patent No.: US 7,377,649 B2
(45) Date of Patent: May 27, 2008

(54) PROJECTOR ARRANGEMENT (75) Inventors: Markus Kamm, Karlsruhe (DE);
Zoltan Facius, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 152 days.

(21) Appl. No.: 11/166,513

(22) Filed: Jun. 24, 2005

(65) Prior Publication Data
US 2005/0286023 A1 Dec. 29, 2005

(30) Foreign Application Priority Data
Jun. 25, 2004 (EP) .................... 04014964

(51) Int. Cl.
G03B 21/14 (2006.01)
G02F 1/13363 (2006.01)

(52) U.S. Cl. ............ 353/20; 353/33; 353/81; 349/9; 348/752

(58) Field of Classification Search ............ 353/20, 353/30–34, 94, 81, 84; 348/752, 756, 757; 349/9
See application file for complete search history.

(56) References Cited
U.S. PATENT DOCUMENTS

| 6,273,567 | B1 | 8/2001 | Conner et al. | |
| 6,304,302 | B1* | 10/2001 | Huang et al. | 349/9 |
| 6,626,540 | B2* | 9/2003 | Ouchi et al. | 353/31 |
| 6,869,184 | B2* | 3/2005 | Yatsu et al. | 353/20 |
| 6,961,181 | B2* | 11/2005 | Chen et al. | 359/498 |
| 2002/0067545 | A1 | 6/2002 | Chuang | |
| 2002/0105602 | A1 | 8/2002 | Pan | |
| 2003/0147051 | A1* | 8/2003 | Fujita et al. | 353/31 |
| 2006/0044514 | A1* | 3/2006 | Ushigome | 353/20 |
| 2006/0044516 | A1* | 3/2006 | Inoko | 353/20 |
| 2006/0055888 | A1* | 3/2006 | Inoko | 353/20 |
| 2006/0103810 | A1* | 5/2006 | Ma et al. | 353/20 |
| 2006/0197914 | A1* | 9/2006 | Robinson | 353/20 |
| 2006/0256289 | A1* | 11/2006 | Fukuzaki et al. | 353/20 |

OTHER PUBLICATIONS

U.S. Appl. No. 11/166,513, filed Jun. 24, 2005, Kamm et al.
U.S. Appl. No. 11/578,154, filed Oct. 11, 2006, Facius et al.

* cited by examiner

*Primary Examiner*—Andrew T Sever
(74) *Attorney, Agent, or Firm*—Oblon, Spivak, McClelland, Maier & Neustadt, P.C.

(57) ABSTRACT

A projector arrangement is provided wherein a spectral splitting and recombination unit (SSR) includes a first and a second polarization selective or polarizing beam splitting device and a wavelength selective optical element (WSOE) which are sufficient to realize the main and/or the entire functionality of said spectral splitting and recombination unit (SSR).

27 Claims, 11 Drawing Sheets

PROJECTOR ARRANGEMENT

A PROJECTOR ARRANGEMENT

More particular, the present invention relates to a projector arrangement having a compact illumination and beam splitting part which uses three reflective display panels and only two beam splitting devices or cubes.

Today, most projector arrangements or projection systems comprise the so-called three panel arrangement which uses three image generating or generation means, units, or devices. In general, primary illumination light, for instance white light is generated and split up in order to generate three spectrally different components which are used to illuminate the image generation units or devices for generating partial images to be superposed in order to finally obtain an image to be displayed.

A major difficulty in the progress of building compact projector arrangements is the necessity of a certain number of optical elements in order to split up the provided primary illumination light, to generate the partial images and to recombine the generated partial images in order to finally obtain the image to be displayed as a superposition of said partial images.

BACKGROUND AND PROBLEM

Figure 1A:
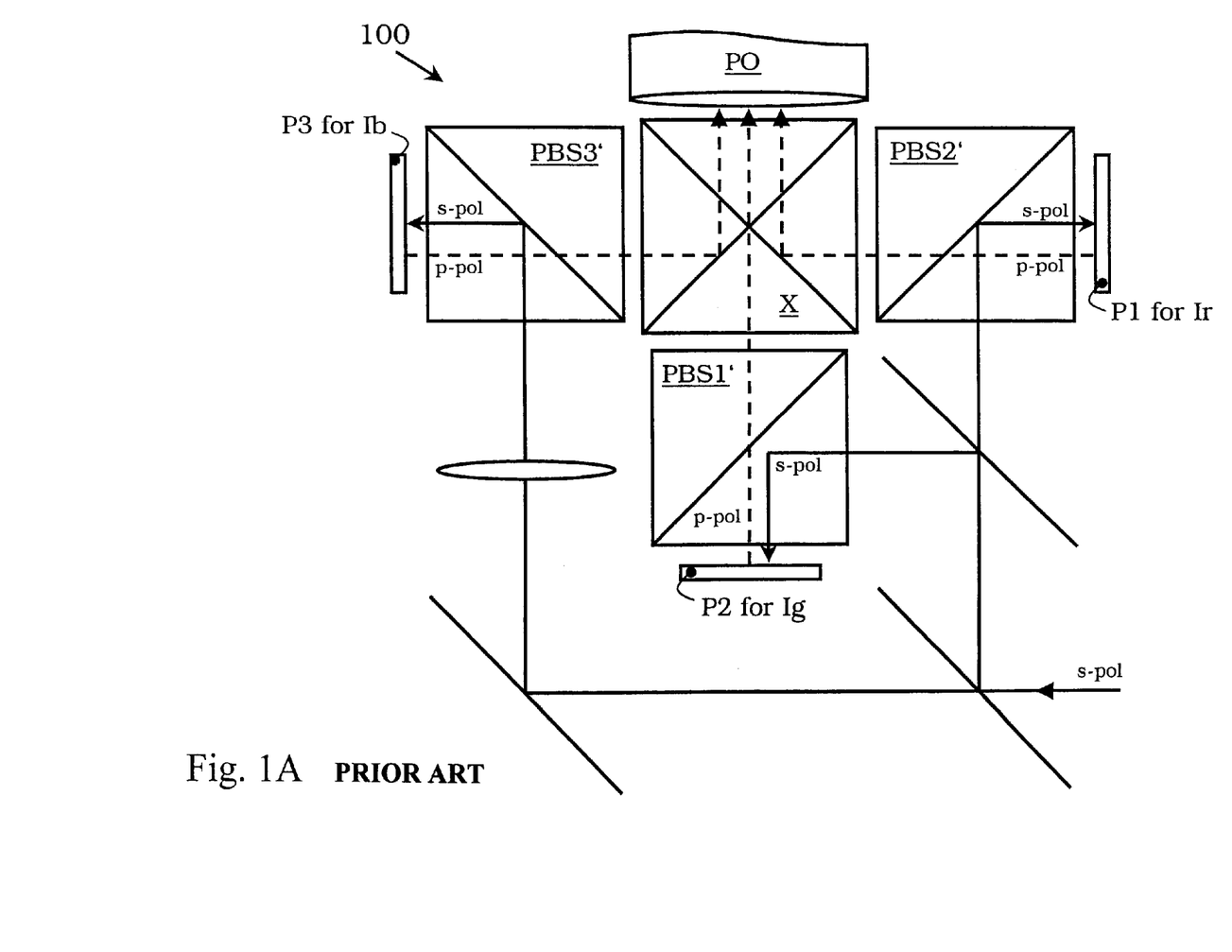
FIGS. 1A,B are schematical block diagrams of prior art projector arrangements.
Figure 1B:
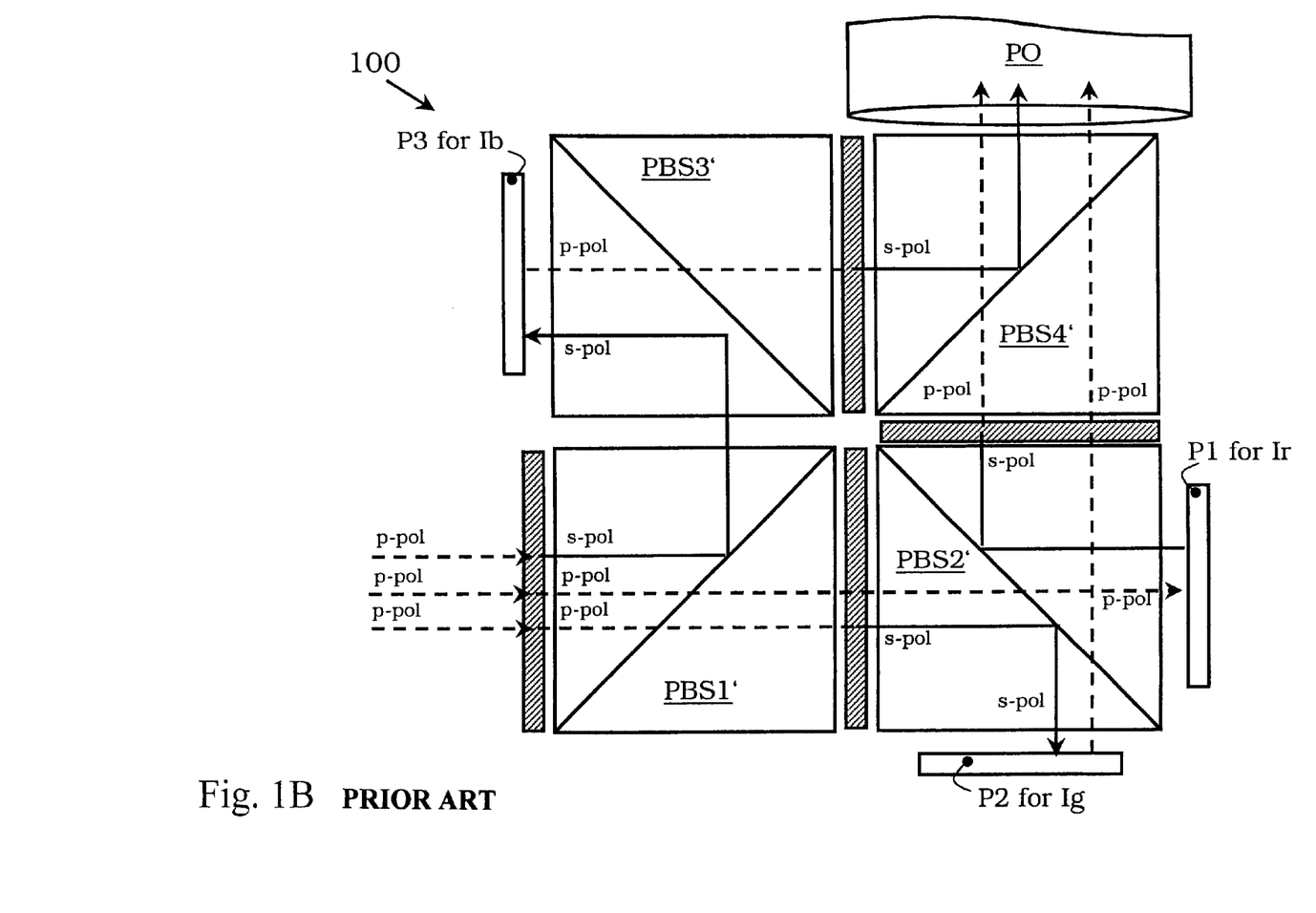

Today's three panel projection systems have the drawback of bulky beam splitter units. The white light is first split by many dichroic mirrors, folding mirrors or polarizing beam-splitters into the primary colors red, green and blue and after being reflected or transmitted by the panels, the light again is recombined by several prism cubes before it is projected by a common projection lens. In the case of reflective panels, this results in a long back-focal length BFL (=distance between the panels and the first surface of the projection lens). A long BFL complicates the design of the projection lens. FIGS. 1a and 1b show two commonly used architectures of optical engines with three reflective panels. In FIG. 1a, the so called "3PBS architecture", light is split by dichroic mirrors and folding mirrors and is recombined by an X-cube. In FIG. 1b, the so-called "ColorQuad" architecture, the light is split and recombined by four polarizing beam-splitters together with wavelength-selective retarders.

Figure 2A:
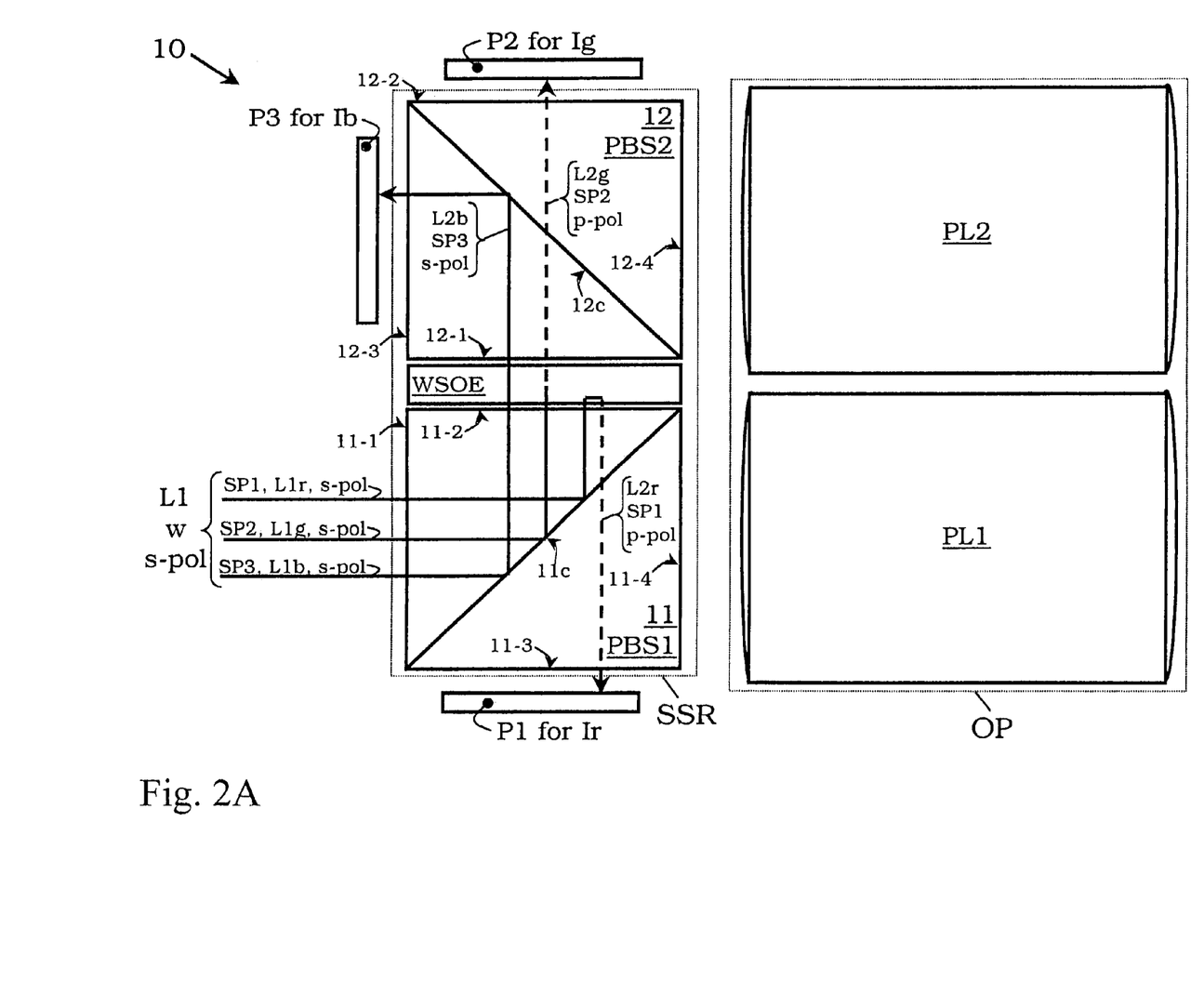
FIGS. 2A-C are schematical block diagrams elucidating a first embodiment of the inventive projector arrangement.

A FIG. 2A shows a basic architecture according to the present invention. It consists of two polarizing beam-splitters PBS1 and PBS2, one wavelength selective optical element WSOE, three display panels P1, P2, P3 and two projection lenses PL1 and PL2 building the optical projection unit OP. The WSOE is placed between the polarizing beam splitters PBS1 and PBS2. One panel is attached to PBS1 and two panels are attached to PBS2. Projection lens PL1 is attached to PBS1 and PL2 is attached to PBS2.

White and s-polarized primary illumination light L1, w is entering the polarizing beam-splitter PBS1 and is reflected by the polarizing beam-splitter coating in direction of the wavelength selective optical element WSOE. One spectral part SP1 of the white light beam L1, w is reflected back by the WSOE thereby changing its polarization state from s- to p-polarization. The p-polarized spectral part SP1 is now transmitting the PBS1 and is entering the display panel P1. The spectral parts SP2 and SP3, which are completely or partly distinct to each other and to SP1, are transmitting the WSOE, thereby changing the polarization state of the spectral part SP2 from s- to p-polarization. The transmitted and still s-polarized spectral part SP3 is reflected by the beam splitter coating of PBS2 and is entering the display panel P3. The p-polarized spectral part SP2 is passing the beam splitter coating of PBS2 and is entering the display panel P2.

Figure 2B:
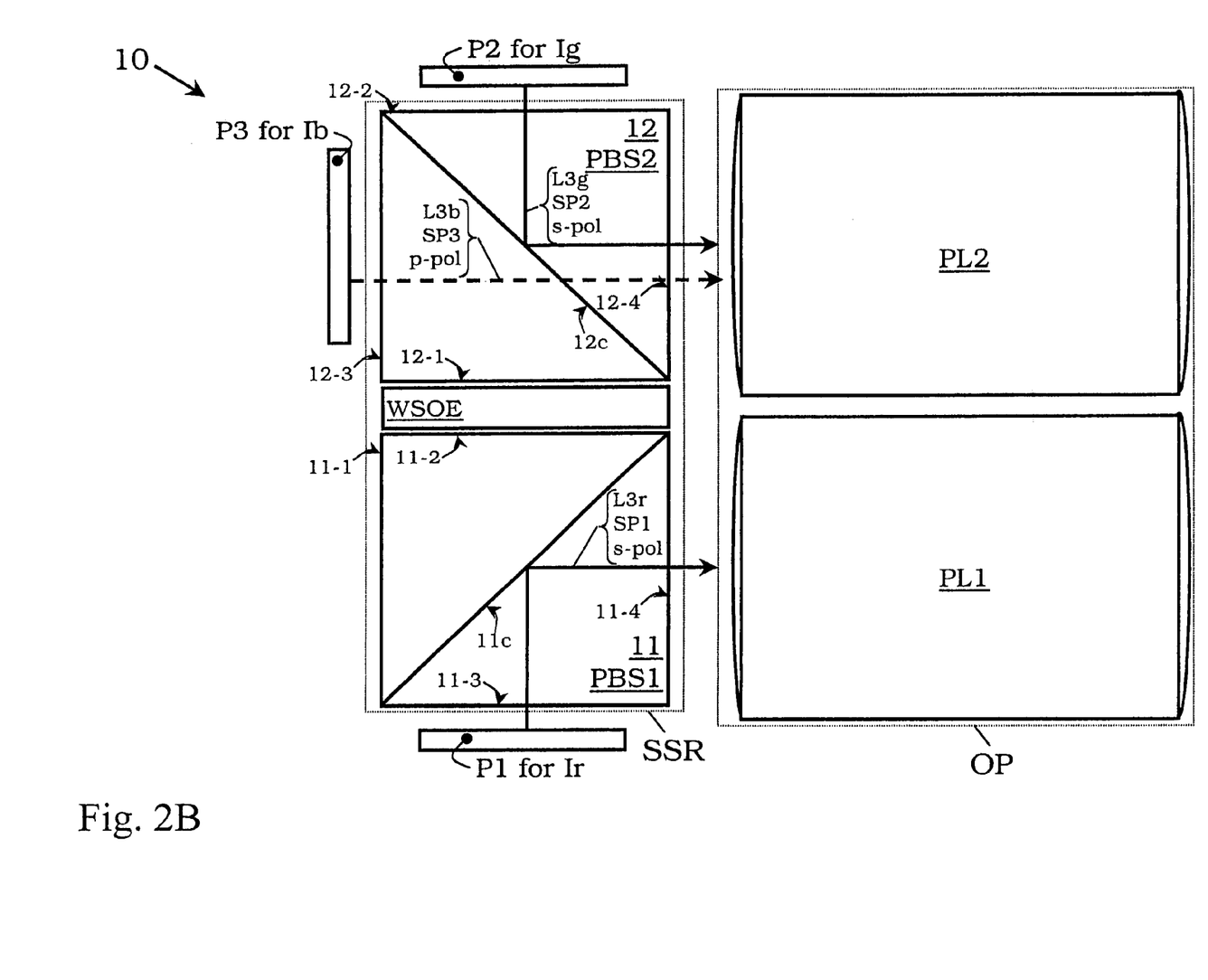

In the ON state the polarization states of the spectral parts SP1 and SP2 are changed from p- to s-polarization and the polarization state of the spectral part SP3 is changed from s- to p-polarization after being reflected by the display panels P1, P2 and P3 respectively: see FIG. 2B. Now the s-polarized spectral part SP1 is reflected by the beam-splitter coating of PBS1 and is entering projection lens PL1. The s-polarized spectral part SP2 is reflected by the beam-splitter coating of PBS2 and is entering projection lens PL2. The p-polarized spectral part SP3 is passing PBS2 and is entering projection lens PL2.

In the OFF state the polarization state of the spectral parts SP1 and SP2 remains p-polarized and the polarization state of the spectral part SP3 remains s-polarized after being reflected by the display panels P1, P2 and P3 respectively. All spectral parts SP1, SP2 and SP3 are now redirected in direction of the illumination unit: see FIG. 2C.

Figure 3:
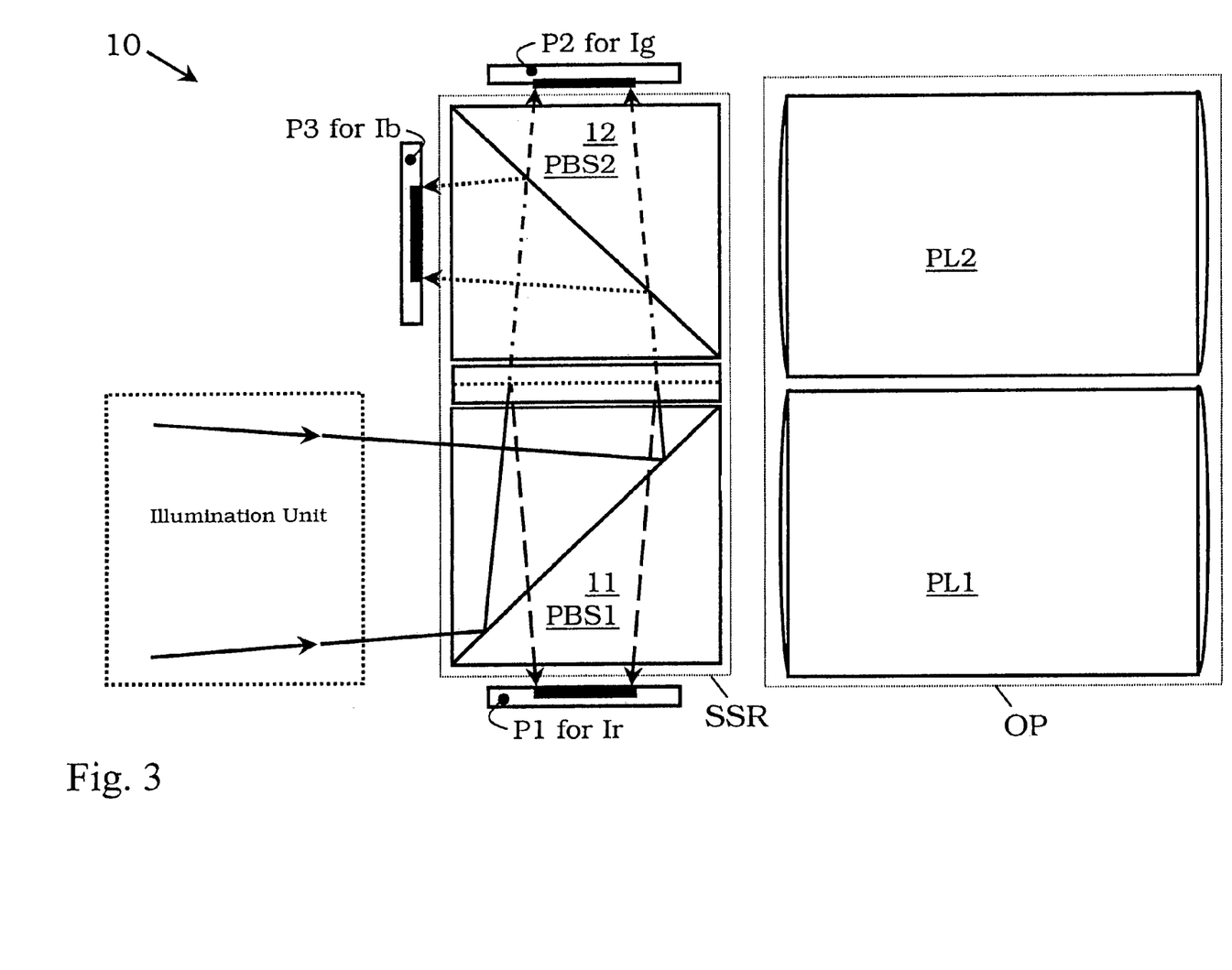

B A common illumination optical unit may be attached to PBS1, as shown in FIG. 3. White light L1, w is emerging from this illumination unit and is entering PBS1. The illumination optical unit is adapted to focus the illuminating light beam to the panels P1, P2, P3. The wavelength selective optical element WSOE is placed between PBS1 and PBS2 in such a way that the optical distance of spectral part SP1 to panel P1 is same like the distance of spectral parts SP2 and SP3 to the panels P2 and P3 respective.

Figure 4:
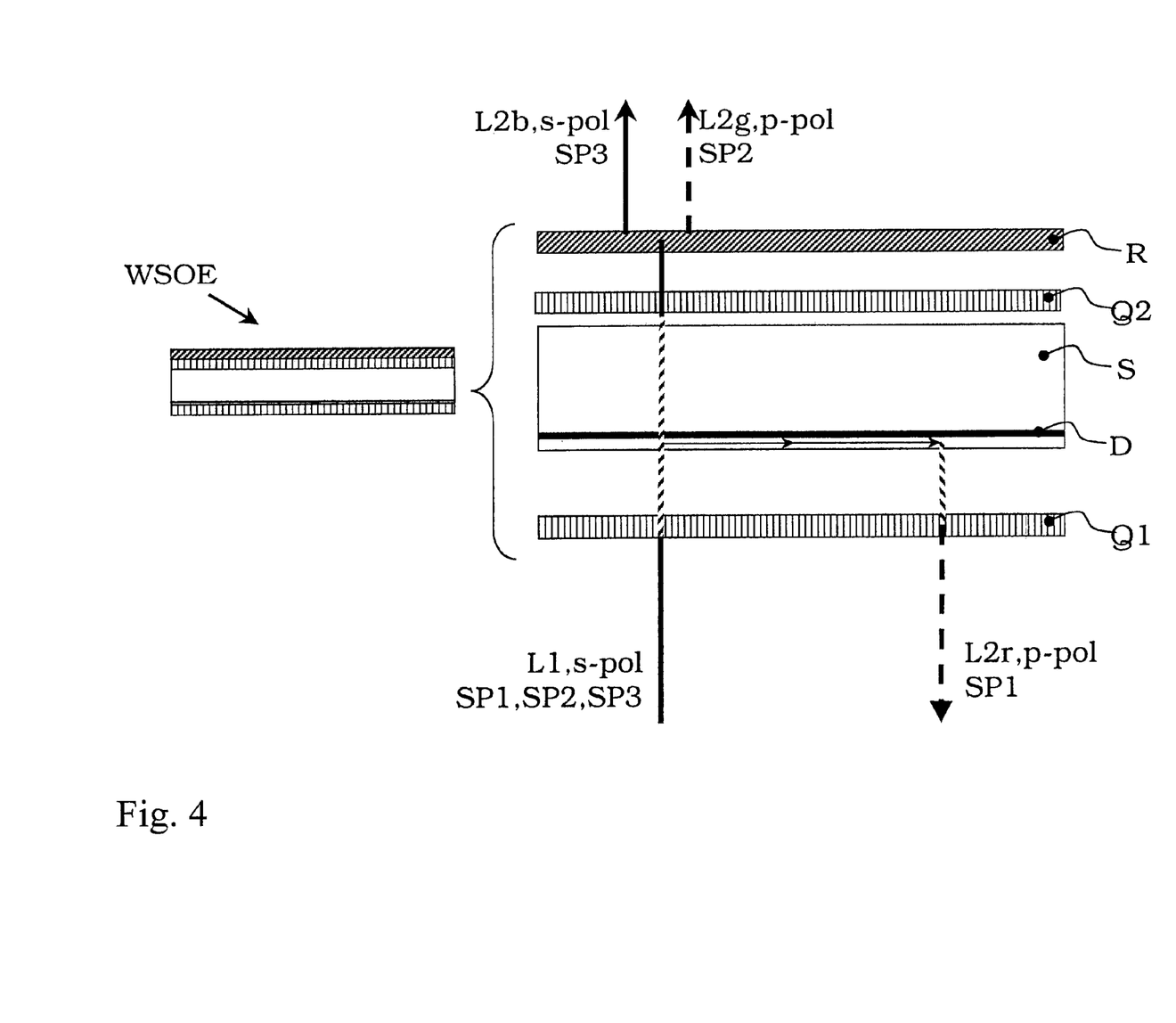

C The wavelength selective optical element WSOE comprises two quarter wave layers Q1 and Q2, a dichroic layer D on a transparent substrate S, e.g. glass and a wavelength dependent retarder R as shown in FIG. 4.

Linear s polarized white light entering the WSOE is passing the first quarter-wave layer, thereby turning the polarization state from linear to circular. Next the light beam hits the dichroic layer D, thereby reflecting spectral part SP1 and changing the chirality of the circular polarized light, e.g. from left circular to right circular. The reflected back spectral part SP1 next passes again the first quarter-wave layer, thereby turning the polarization state to linear p.

The transmitted spectral parts SP2 and SP3 are next passing the second quarter wave layer Q2, thereby turning the polarization state from circular to linear. By passing the wavelength selective retarder R the polarization state of spectral part SP2 is turned from s-polarized to p-polarized or—alternatively the polarization state of spectral part SP3 is turned from p-polarized to s-polarized.

Figure 5:
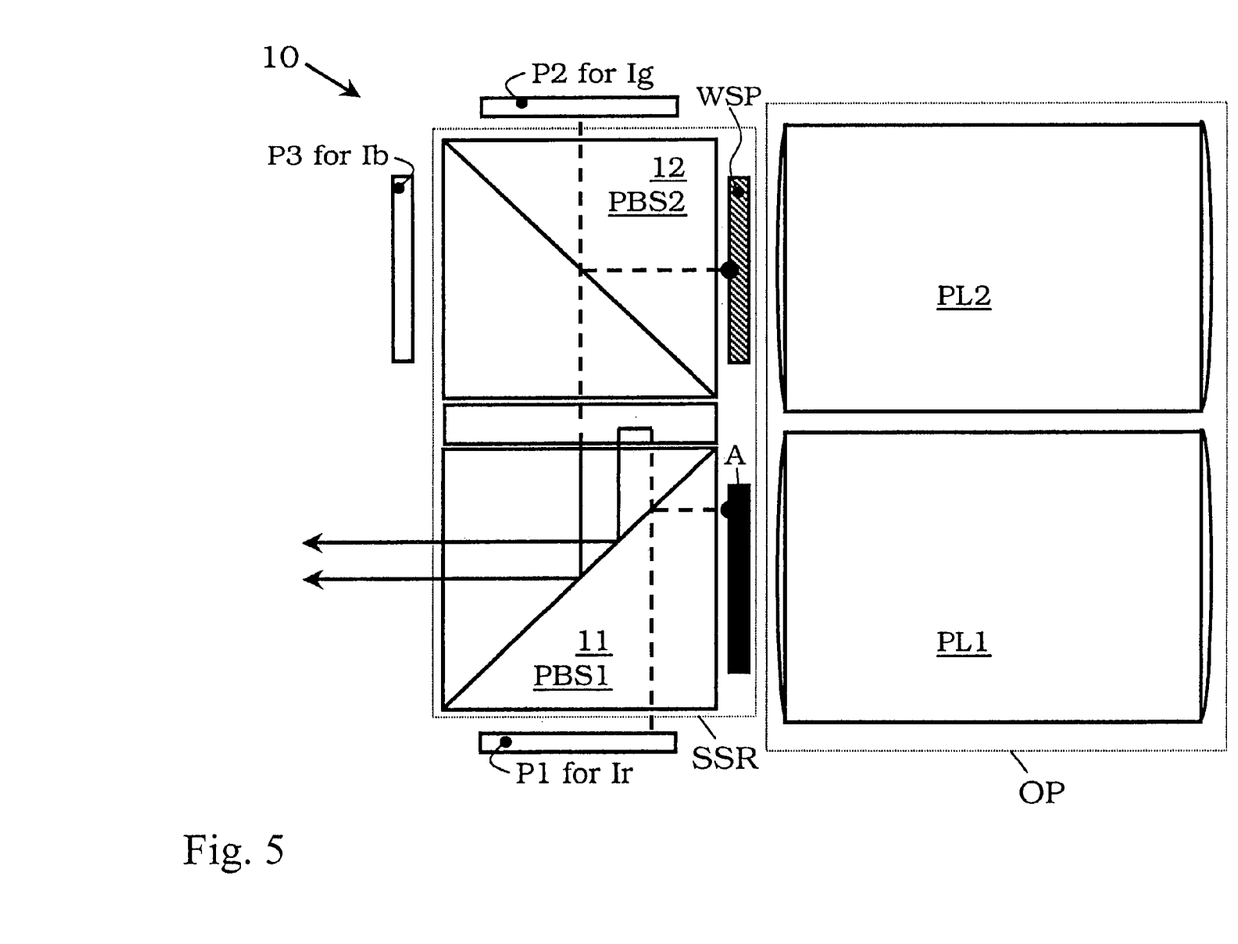

D Light of spectral part SP2 is reflected in p-polarized mode from the display panel P2 when the panel is in the OFF state as shown in FIG. 5. Ideally, all of the p-polarized light is passing the PBS2 in direction to PBS1. But, as a general attribute of polarizing beam-splitters, about 10% of the p-polarized light is reflected at the polarizing beam-splitter coating. Therefore—even in the OFF (=black) state—about 10% of the light would enter the projection lens, resulting in a worse contrast.

To overcome this loss in contrast, an additional clean-up polarizer in front of the projection lens PL2 is required to block the leaking p-polarized light. This clean-up has to be a wavelength selective polarizer WSP, because only p-polarized light of spectral part SP2 must be blocked. The p-polarized light of spectral part SP3, which comes from display panel P3 in the ON state, must be transmitted by the WSP.

E The wavelength selective polarizer WSP mentioned in section D can be of following types:

Cholesteric polarizer (CF) with adapted quarter-wave layers. This CF reflects the leaking p-polarized light of spectral part SP2, but lets through spectral part SP3 and all s-polarized light of spectral part SP2.

Colour selective retarder, which turns the polarization state of spectral part SP2 from p polarized to s polarized and from s polarized to p polarized and leaves the polarization state of spectral part SP3 as it is. An additional absorbing polarizer then absorbs all s-polarized light.

An absorptive wavelength selective polarizer which is adapted in such way that p-polarized light of spectral part SP2 is absorbed, but p-polarized light of spectral part SP3 and s-polarized light from SP2 is transmitted.

F Light of spectral part SP1 is reflected in p-polarized mode from display panel P1 when the panel is in the OFF state as shown in FIG. 5. Ideally, all of the p-polarized light is passing the PBS1 in direction to PBS2. But, as a general attribute of polarizing beam splitters, about 10% of the p-polarized light is reflected at the polarizing beam splitter coating. Therefore—even in the OFF (=black) state—about 10% of the light would enter the projection lens, resulting in a worse contrast.

To overcome this loss in contrast, an additional clean-up polarizer or analyser A in front of the projection lens PL1 is required to block the leaking p-polarized light. In contrast to section D this clean-up polarizer A can be of standard type, as only light in the spectral part SP1 is influenced.

G In reality the diameter of the projection lenses PL1 and PL2 exceed the diameter of the polarizing beam-splitter cubes PBS1 and PBS2. As a result, the distance between PBS1 and PBS2 must be large enough to fit to both projection lenses PL1 and PL2. Especially rear projection lenses have front lenses with a large diameter.

Figure 6A:
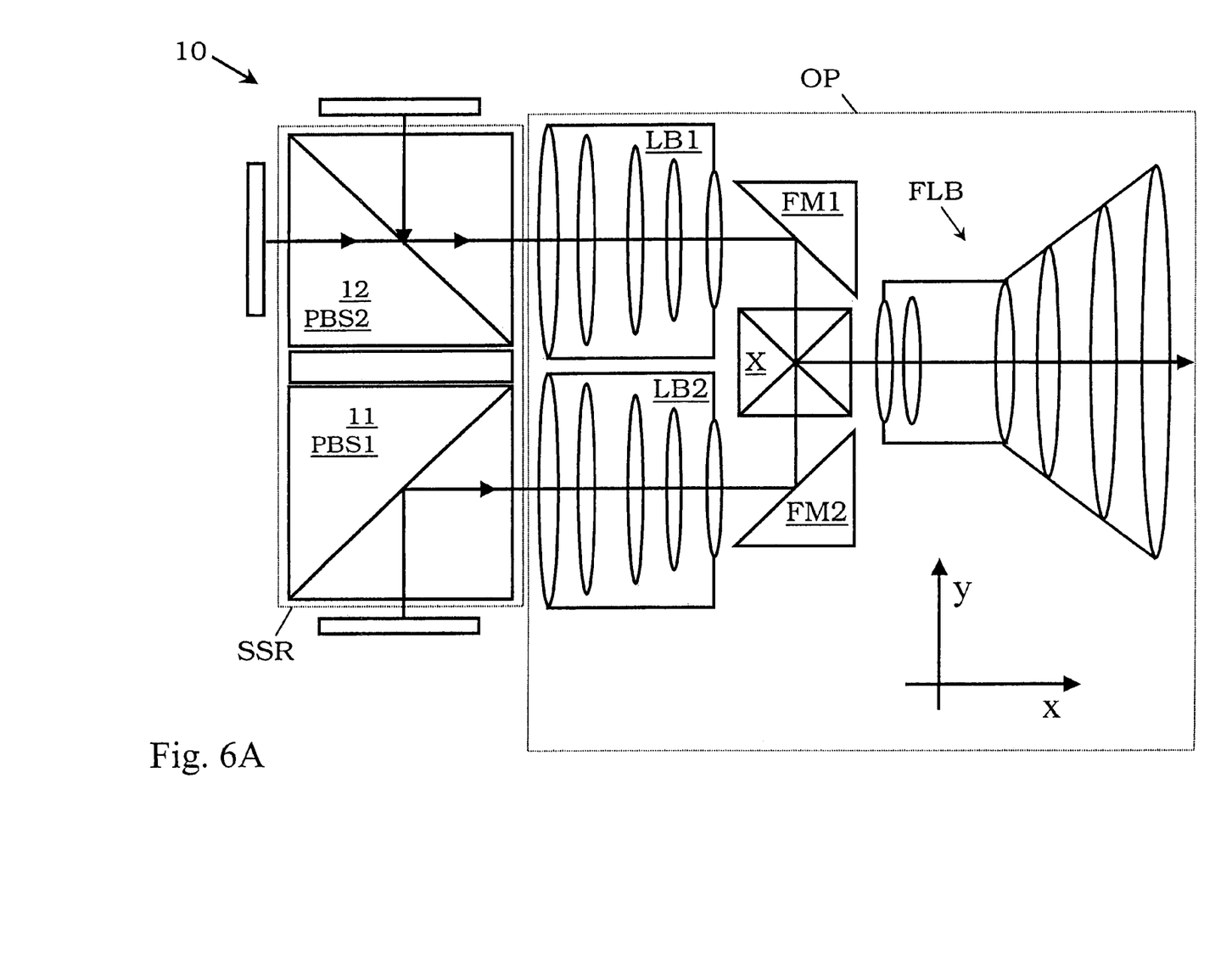

To overcome this space requirement the projection lenses could be split in two separate first lens blocks LB1 and LB2 attached to PBS1 and PBS2, respectively, and a common second or front lens block FLB as shown in FIG. 6A. Folding mirrors FM1, FM2 combine the two separate light paths coming from the first lens blocks LB1 and LB2 into the common front lens block FLB. An X prism X combines the light coming from lens block LB1 with light coming from lens block LB2. The X prism X has two different dichroic coatings. One coating is to reflect the light of spectral part SP1 and the other to reflect the light of spectral parts SP2 and SP3 into the common front lens block FLB.

Figure 6B:
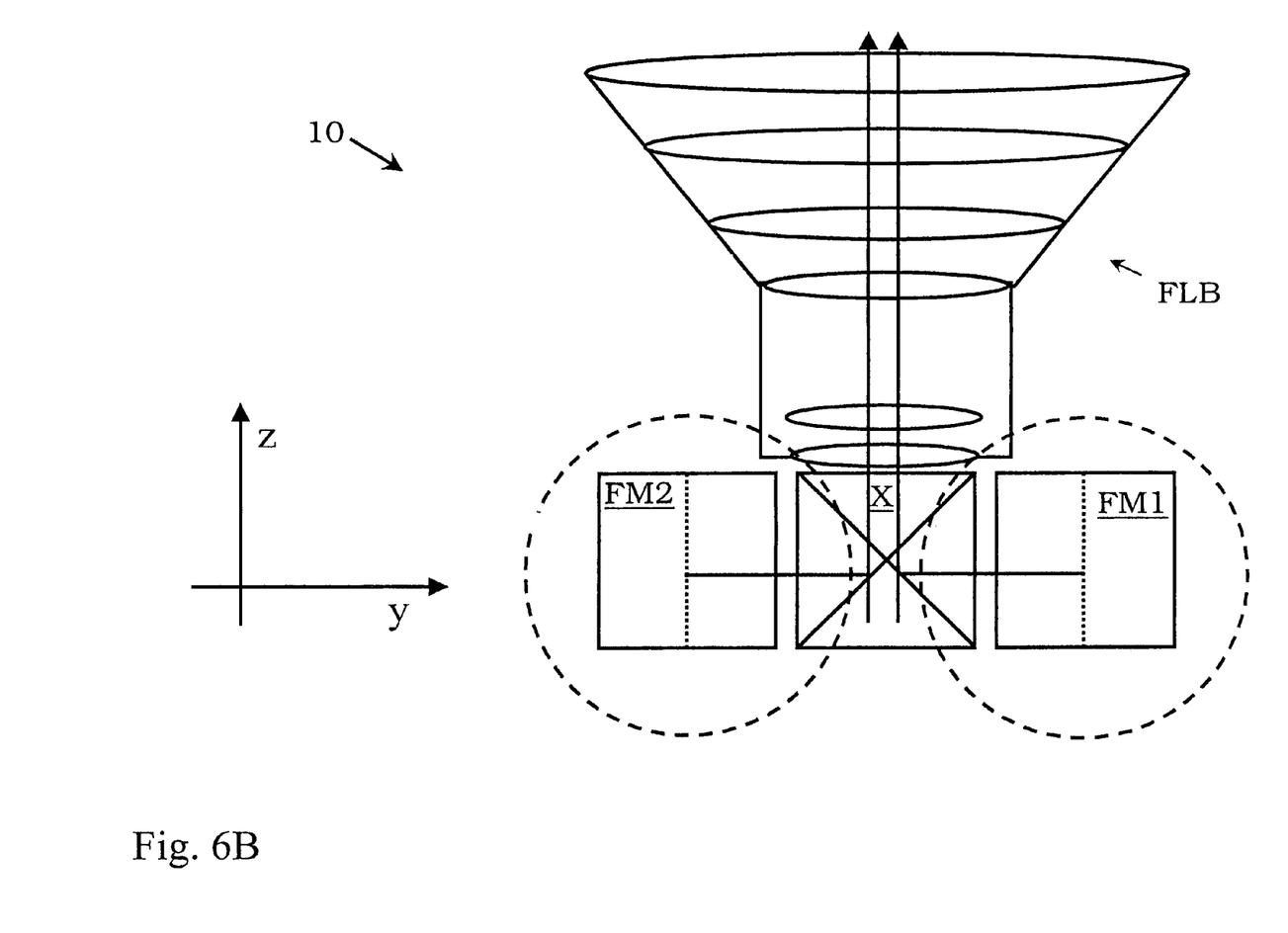

H Alternatively, the X prism X can be rotated by 90° in order to fold the common light path together with the front lens block FLB out of the plane as shown in FIG. 6B. This has the advantage of small footprint and adapts the engine to be used in rear projection cubes.

Figure 7:
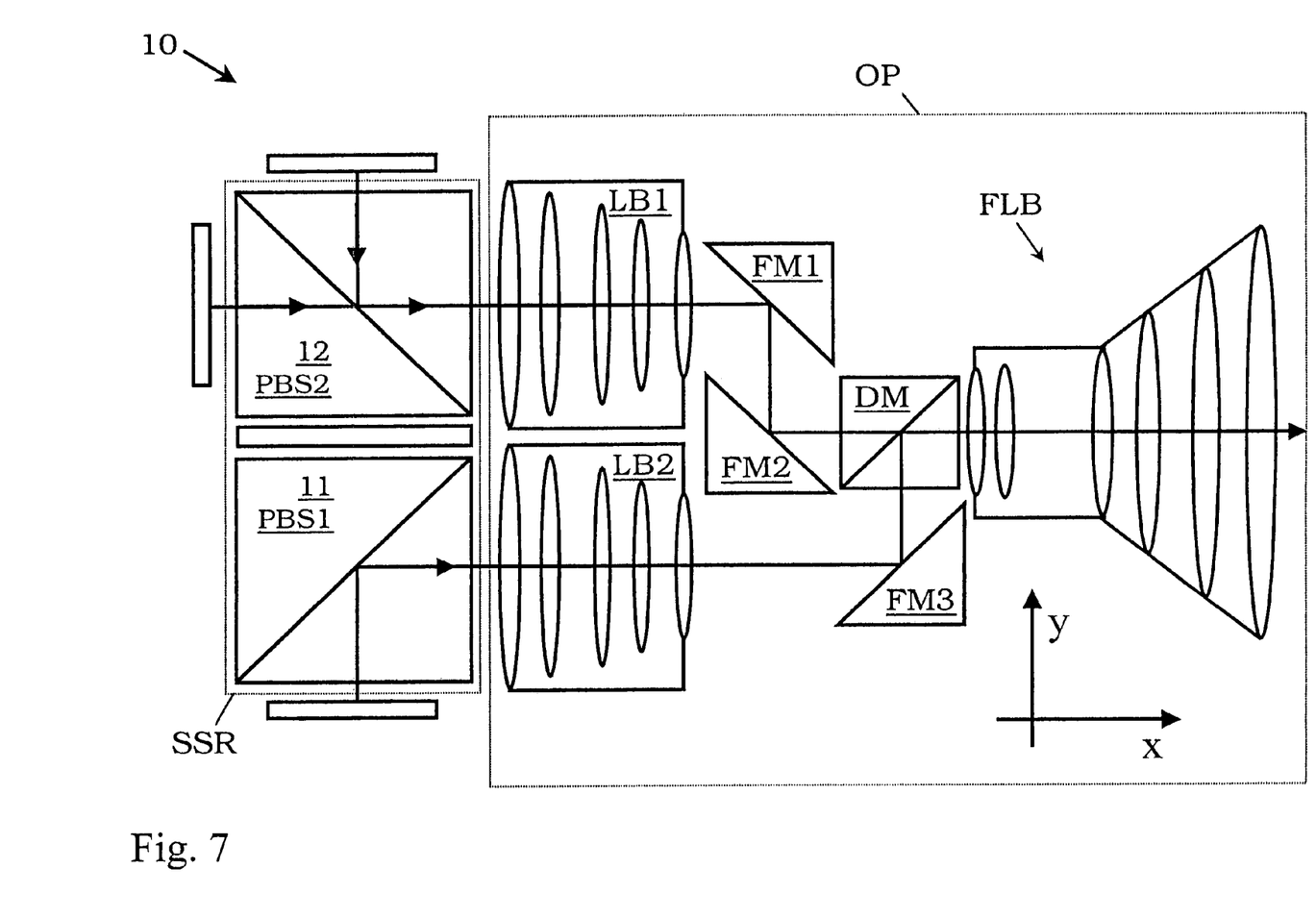

I Instead of using an X prism X to recombine the two light paths into one an arrangement according to FIG. 7 can be used. It comprises three folding mirrors FM1, FM2, FM3 and one dichroic mirror prism DM to recombine the two light paths.

Existing projection systems with three reflective display panels are using three to four beam splitter cubes and need a long back-focal length of the projection lens. The invention describes a projection system with outstanding compact illumination and beam splitter part using only two beam-splitter cubes. The projection lens or lenses has/have a short back focal length.

BRIEF DESCRIPTION OF THE SEVERAL VIEWS OF THE DRAWINGS

FIGS. 3-7 demonstrate by means of schematical block diagrams aspects of further embodiments of the inventive projector arrangement.

DETAILED DESCRIPTION

In the following similar elements and structures with respect to their functionality and construction are denoted by the same reference symbols. A detailed description is not repeated in each case of their occurrence.

As already indicated above, prior art projector arrangements 100 as shown in FIGS. 1A and 1B possess a comparable large number of optical elements and they are therefore more complicated as introduced by the present invention, as can be obtained by the schematical block diagrams of FIGS. 1A und 1B.

Figure 2C:
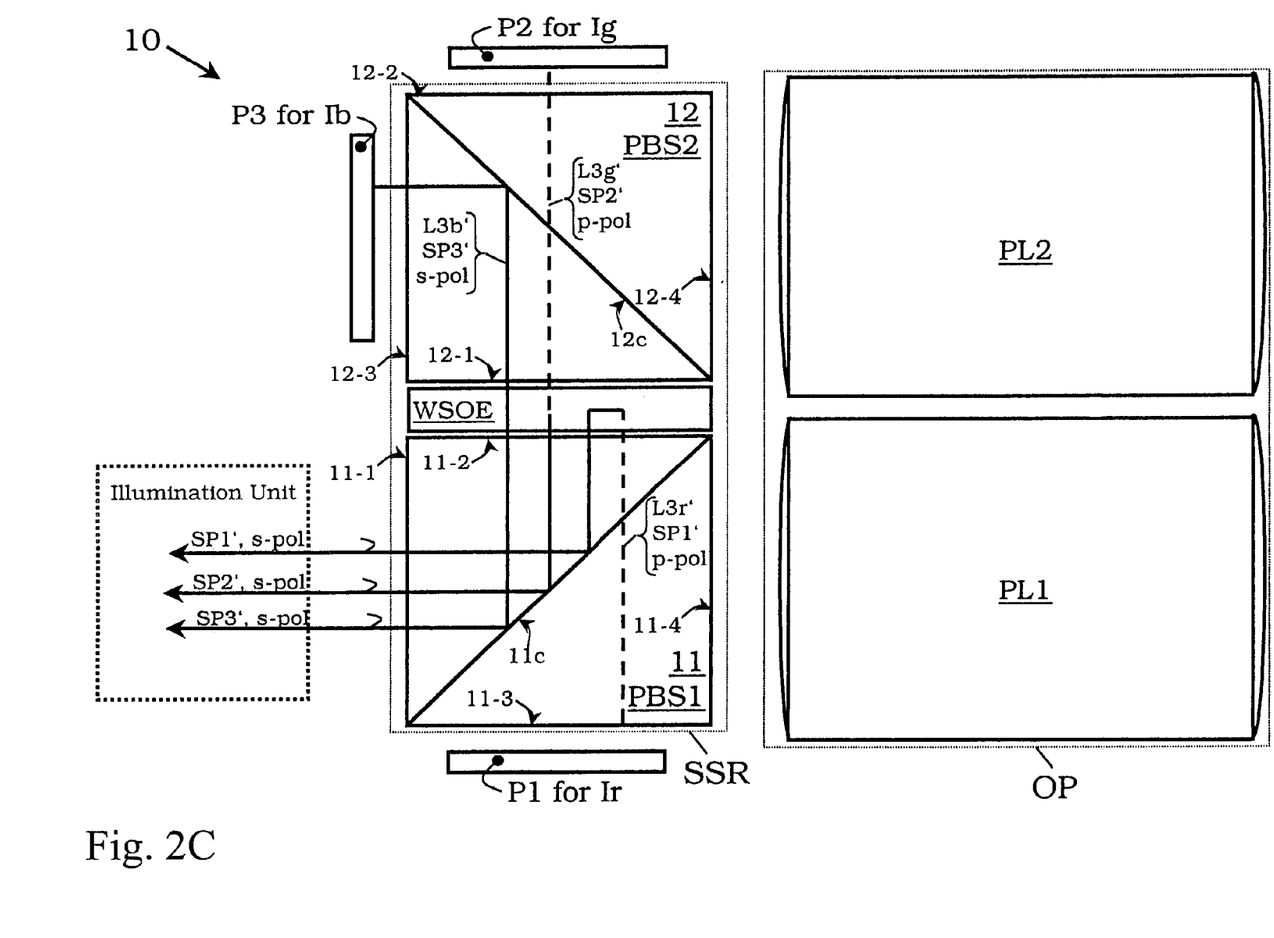

FIGS. 2A to 2C demonstrate by means of schematical block diagrams the basic structure of an embodiment of the inventive projector arrangement 10 with respect to three operational states.

The embodiment of the inventive projector arrangement 10 as shown in FIG. 2A to 2C comprises a spectral splitting and recombination unit SSR and an optical projection unit OP as basic constituents. Additionally, first, second, and third image generating/generation means/devices or units P1, P2, and P3 are provided, which are adapted and assigned for generating first to third partial images Ir, Ig, Ib of an image I to be displayed.

The spectral splitting and recombination unit SSR comprises a first polarization selective or polarizing beam splitting device PS1, 11 and a second polarization selective or polarizing beam splitting device PS2, 12. Said first and said second polarization selective or polarizing beam splitting devices PBS1, 11; PBS2, 12 may be built by so called beam splitting cubes, or the like. Said first polarization selective or polarizing beam splitting device PBS1, 11 comprises a first, a second, a third, and a fourth surface 11-1, 11-2, 11-3, and 11-4, respectively. Additionally, a polarization selecting or selective interface 11c is provided.

In a similar manner said second polarization selective or polarizing beam splitting device PBS2, 12 comprises a first, a second, a third, and a fourth surface 12-1, 12-2, 12-3, and 12-4, respectively, as well as a polarization selective/selecting interface 12c.

The first surface 11-1 of said first polarization selective or polarizing beam splitting device PBS 1, 11 serves as a light entrance for the spectral splitting and recombination unit SSR and therefore for the inventive projector arrangement 10. White light w—here having a s-polarized polarization state and being constituted by first to third spectrally separated, non-overlapping and complementary primary illumination light components L1r, L1g, L1b; SP1, SP2, SP3, respectively—enters as primary illumination light L1 said first surface 11-1 as said light entrance section or portion. Because of its s-polarized polarization state said primary illumination light L1, and in particular its first to third primary illumination light components L1r, L1g, L1b; SP1, SP2, SP3 are reflected from said first surfaces 11-1 by said polarization selective interface 11c to said second surface 11-2 of said first polarization selective or polarizing beam splitting device PBS1, 11 and thereby leave said first polarization selective or polarizing beam splitting device PBS1, 11 in order to interact the wavelength selective optical element WSOE, which is provided between said second surface 11-2 of said first polarization selective or polarizing beam splitting device PBS1, 11 and the first surface 12-1 of said second polarization selective or polarizing beam splitting device PBS2, 12 or in an optical path between these surfaces.

Upon interaction the first to third primary illumination light components L1r, L1g, L1b; SP1, SP2, SP3 which may be referred to as secondary illumination light components L2r, L2g, and L2b, respectively, of secondary illumination light L2 as light for said partial images Ir, Ig, and Ib, respectively, to be generated, primary illumination light L is split up into its distinct spectral components. The first secondary illumination light component L2r stems from the first primary illumination light component L1r, SP1 and is reflected by the interaction of the wavelength selective optical element WSOE and thereby obtains a p-polarized polarization state and re-enters the first polarization selective or polarized beam splitting device PBS1, 11 via its second surface 11-2 thereof. Because of its p-polarized polarization state said first secondary illumination light component L2r is transmitted by the polarization selective interface 11c of said first polarization selective or polarizing beam splitting device PBS 1, 11 in order to hit the third surface 11-3 thereof to leave the same in order to interact as light for said first partial image Ir to be generated with a first image generating means/unit P1 for said first partial image Ir, which is provided in the neighbourhood or vicinity of said first surface 11-3.

Upon interaction of the second primary illumination light component L1g, SP2 with said wavelength selective optical element WSOE between the second surface 11-2 and the first surface 12-1 of said first polarization selective or polarizing beam splitting device PBS1, 11 and said second polarization selective or polarizing beam splitting device PBS2, 12, respectively, the polarization state of said second primary illumination light component L1g, SP2 is changed to a p-polarized polarization state, thereby generating a second secondary illumination light component L2g as light for said second partial image Ig to be generated. Said second secondary illumination light component L2g is because of its p-polarized polarization state directly transmitted from said first interface 12-1 to said second surface 12-2 of said second polarization selective or polarizing beam splitting device PBS2, 12 via its polarization selecting interface 12c in order to leave said second polarization selective or polarizing beam splitting device PBS2, 12 via its second surface 12-2 and in order to interact with a second image generating means/unit P2 for said second partial image Ig, which is provided in the neighbourhood or vicinity of said second surface 12-2 of said second polarization selective or polarizing beam splitting device PBS2, 12.

Upon interaction of said third primary illumination light component L1b, SP3 with said wavelength selective optical element WSOE between said second surface 11-2 and said first surface 12-1 of said first polarization selective or polarizing beam splitting device PBS1, 11 and said second polarization selective or polarizing beam splitting device PBS2, 12, respectively, said third primary illumination light component L1b, SP3 obtains a s-polarized polarization state to thereby form a third secondary illumination light component L2b as light for said third partial image Ib to be generated. Because of its s-polarized polarization state said third secondary illumination light component L2b is reflected by said polarization selecting interface 12c of said second polarization selective or polarizing beam splitting device PBS2, 12 directly from said first surface 12-1 to said third surface 12-3 of said second polarization selective or polarizing beam splitting device PBS2, 12 in order to leave said second polarization selective or polarizing beam splitting device PBS2, 12 via its third surface 11-3 and in order to interact with a third image generating means/device P3 for said third partial image Ib to be generated.

Upon interaction of said first, second and third secondary illumination light components L2r, L2g, and L2b, respectively, as light for said first, second, and third partial images Ir, Ig, Ib, respectively, to be generated, first, second, and third tertiary illumination light components L3r, L3g, and L3b as light of said first, second, and third partial images Ir, Ig, and Ib are generated having a s-polarized polarization state, a s-polarized polarization state, and a p-polarized polarization state, respectively. These tertiary illumination light components L3r, L3g, and L3b re-enter the respective first and second polarization selective or polarizing beam splitting devices PBS1, 11; PBS2, 12 via its respective third surface 11-3, second surface 12-2, and third surface 12-3, respectively. Upon further interaction with respective polarization selecting interfaces 11c and 12c, respectively, these first tertiary illumination light components L3r, L3g, and L3b, respectively, are reflected, reflected and transmitted from the third surface 11-3 to the fourth surface 11-4 of said first polarization selective or polarizing beam splitting device PBS1, 11, from said second surface 12-2 to said fourth surface 12-3 of said second polarization selective or polarizing beam splitting device PBS2, 12, and from said third surface 12-3 to said fourth surface 12-4 of said second polarization selective or polarizing beam splitting device PBS2, 12, respectively, in order to leave the respective polarization selective beam splitting devices PBS 1, 11; PBS2, 12 and in order to enter the optical projection unit OP, which is provided in the vicinity or neighbourhood of said fourth surfaces 11-4 and 12-4 or in an optical path thereof.

FIG. 2A demonstrates the basic architecture of this embodiment, whereas FIGS. 2B and 2C demonstrate the ON state and the OFF state, respectively, of the first, second and third image generating means or devices P1, P2 and P3, respectively, which are in the case of FIGS. 2A to 2C reflective imaging panels. FIG. 2C also indicates the off light or lost waste light components SP1', SP2', and SP3' with the respective components L3r', L3g', L3b'.

FIG. 3 shows an embodiment which is similar to that of FIGS. 2A to 2C but now additionally illustrates the provided illumination unit which is arranged and adapted in order to provide the primary illumination light L1.

In FIG. 4 a possible embodiment for the wavelength selective optical element WSOE is indicated as already described above.

FIG. 5 illustrates the provision of several blocking mechanisms to further enhance the functionality and the reliability of the inventive projector arrangement as already mentioned above.

FIGS. 6A, 6B, and 7 elucidate further embodiments of the inventive arrangement having different architectures for the optical projection unit OP.

The invention claimed is:
1. A projector arrangement, comprising:
a first, a second, and a third image generating means;
a spectral splitting and recombination unit (SSR); and
an optical projection unit, wherein said first, said second, and said third image generating means are arranged to generate a first, a second, and a third partial image, respectively, said SSR is arranged to receive primary illumination light, comprising spectrally distinct components, said SSR comprises a first and a second polarizing device, said polarizing device comprising at least one of polarization selective device and polarizing beam splitting device, said SSR and said first polarizing device are arranged to receive said primary illumination light through a single and common face of said first polarizing device and said SRR, a said SRR further comprises a wavelength selective optical element (WSOE) between said first polarizing device and said second polarizing device, said WSOE is located between a second surface of said first polarizing device and a first surface of said second polarizing device in a connected optical path between these entities, said WSOE is arranged:

to receive said first spectral component of the primary illumination light an s-polarized polarization state in and to reflect said first light component, thereby changing its s-polarized polarization state into a p-polarized polarization state, and to receive said second spectral component of the primary illumination light in an s-polarized polarization state and to transmit said light component thereby changing its s-polarized polarization state into a p-polarized polarization state, and to receive said third spectral component of the primary illumination light in an s-polarized polarization state and to transmit said light component thereby leaving its s-polarized polarization state unchanged, and wherein the main or the entire functionality of said SSR is completely realized by said first polarizing device, said second polarizing device and said WSOE.

2. The projector arrangement according to claim 1, wherein said WSOE comprises a first quarter wave layer, a dichroic layer, a second quarter wave layer, and a wavelength dependent retarder layer in order from said first polarizing device to said second polarizing device on the basis of an underlying transparent substrate.

3. The projector arrangement according to claim 1 wherein said SSR is arranged:

to receive primary illumination light comprising first, second, and third-spectrally disjunct or spectrally complemental primary illumination light components, to spectrally split said primary illumination light into said first, second, and third primary illumination light components serving as secondary illumination light components and as light for said first, second, and third partial images to be generated, to direct said first, second, and third secondary illumination light components to said first, second, and third image generating means, to receive light from said first, second, and third image generating means as first, second, and third tertiary illumination light components as light of said generated first, second, and third partial images, respectively, and to at least partly recombine and direct said first, second, and third tertiary illumination light components to said optical projection unit.

4. The projector arrangement according to claim 1 wherein said SSR is arranged and wherein said optical projection unit is arranged:

to receive said tertiary illumination light components or a derivative or combination thereof from the SSR, and to output and project said tertiary illumination light components or a derivative or combination thereof to thereby image and project a combination of said first, second, and third partial images as an image to be displayed.

5. The projector arrangement according to claim 1, wherein said first polarizing device is arranged for receiving said primary illumination light, first, second, and third spectral primary illumination light components or a derivative thereof in particular in an s-polarized polarization state.

6. The projector arrangement according to claim 1, wherein said first polarizing device comprises a first surface arranged to have said primary illumination light, first, second, and third spectral primary illumination light components or a derivative thereof-in said s-polarized polarization state enter said first polarizing device.

7. The projector arrangement according to claim 1, wherein said first polarizing device comprises a second surface arranged to have said primary illumination light, first, second, and third spectral primary illumination light components or a derivative thereof in said s-polarized polarization state exit said first polarizing device to have said primary illumination light, its first, second, and third spectral primary illumination light components or a derivative thereof interact with a provided WSOE to generate said secondary illumination light components of said secondary illumination light as light for said first, second, and third partial images to be generated.

8. The projector arrangement according to claim 7, wherein said second surface of said first polarizing device is arranged to have said first spectral primary illumination light component of said primary illumination light or a derivative thereof in a p-polarized polarization state re-enter said first polarizing device as said first secondary illumination light component of said secondary illumination light as light for said first partial image after interaction with said provided WSOE.

9. The projector arrangement according to claim 1, wherein said first polarizing device comprises a third surface arranged to have said first secondary illumination light component of said secondary illumination light or a derivative thereof in a p-polarized polarization state exit said first polarizing device as light for said first partial image in particular to have said first secondary illumination light component of said secondary illumination light or said derivative thereof interact with said first image generating means for said first partial image to generate said first partial image and said first tertiary illumination light component of said tertiary illumination light as light of said first partial image in said s-polarized polarization state.

10. The projector arrangement according to claim 1, wherein said first polarizing device comprises a fourth surface arranged to have said first tertiary illumination light component of said tertiary illumination light or a derivative thereof as light of said first partial image of said s-polarized polarization state exit said first polarizing beam splitting device to direct said first tertiary illumination light component of tertiary illumination light or said derivative thereof as light of said first partial image to said optical projection unit.

11. The projector arrangement according to claim 1,
wherein said first polarizing device comprises a polarization selecting interface arranged to reflect light of said s-polarized polarization state and to transmit light of said p-polarized polarization state.

12. The projector arrangement according to claim 11,
wherein said polarization selecting interface of said first polarizing device is arranged to reflect and redirect said primary illumination light, its first, second, and third spectral primary illumination light components or a derivative thereof in said s-polarized polarization state from said first surface of said first polarizing device to said second surface of said first polarizing device.

13. The projector arrangement according to claim 11,
wherein said polarization selecting interface of said first polarizing device is arranged to transmit said first secondary illumination light component of secondary illumination light or said derivative thereof as light for said first partial image in said p-polarized polarization state from said second surface of said first polarizing device to said third surface of said first polarizing device.

14. The projector arrangement according to claim 11,
wherein said polarization selecting interface of said first polarizing device is arranged to reflect said first tertiary illumination light component of tertiary illumination light or a derivative thereof as light of said first partial image in said s-polarized polarization state from said third surface of said first polarizing device to said fourth surface of said first polarizing device.

15. The projector arrangement according to claim 1,
wherein said second polarizing device is arranged for receiving said second and third secondary illumination light components of said secondary illumination light or a derivative thereof as light for said second and said third partial images to be generated in said p-polarized polarization state or in said s-polarized polarization state, respectively from said first polarizing device, from the second surface thereof or from said provided WSOE in particular after interaction with said provided WSOE.

16. The projector arrangement according to claim 1,
wherein said second polarizing device comprises a first surface arranged to have said second and third primary illumination light components of said primary illumination light, said second and third secondary illumination light components of said secondary illumination light or a derivative thereof in said p-polarized polarization state or in said s-polarized polarization state, respectively enter said second polarizing device as light for said second and said third partial images, respectively, to be generated from said first polarizing device, from the second surface thereof or from said provided WSOE after interaction with said provided WSOE.

17. The projector arrangement according to claim 1,
wherein said second polarizing device comprises a second surface arranged to have said second secondary illumination light component of said secondary illumination light or a derivative thereof in said p-polarized polarization state exit said second polarizing device as light for said second partial image to be generated to have said second secondary illumination light component of said secondary illumination light or a derivative thereof interact with said second image generating means for said second partial image to generate said second partial image and said second tertiary illumination light component of tertiary illumination light as light of said second partial image in said s-polarized polarization state.

18. The projector arrangement according to claim 17,
wherein said second surface of said second polarizing device is arranged to have said second tertiary illumination light component of tertiary illumination light or a derivative thereof in said s-polarized polarization state re-enter said second polarizing device as light of said second partial image.

19. The projector arrangement according to claim 1,
wherein said second polarizing device comprises a third surface arranged to have said third secondary illumination light component of said secondary illumination light or a derivative thereof in said s-polarized polarization state exit said second polarizing device as light for said third partial image to be generated to have said third secondary illumination light component of said secondary illumination light or a derivative thereof interact with said third image generating means for said third partial image to generate said third partial image and said third tertiary illumination light component of tertiary illumination light as light of said third partial image in said p-polarized polarization state.

20. The projector arrangement according to claim 19,
wherein said third surface of said second polarizing device is arranged to have said third tertiary illumination light component of tertiary illumination light or a derivative thereof in said p-polarized polarization state re-enter said second polarizing device as light of said third partial image.

21. The projector arrangement according to claim 1,
wherein said second polarizing device comprises a fourth surface arranged:
to have said second tertiary illumination light component of tertiary illumination light or a derivative thereof as light of said second partial image of said s-polarized polarization state exit said second polarizing device to direct said second tertiary illumination light component of tertiary illumination light or a derivative thereof as light of said second partial image to said optical projection unit, or
to have said third tertiary illumination light component of tertiary illumination light or a derivative thereof as light of said third partial image of said p-polarized polarization state exit said second polarizing device in particular to direct said third tertiary illumination light component of tertiary illumination light or a derivative thereof as light of said third partial image to said optical projection unit.

22. The projector arrangement according to claim 1,
wherein said second polarizing device comprises a polarization selecting interface arranged to reflect light of said s-polarized polarization state and to transmit light of said p-polarized polarization state.

23. The projector arrangement according to claim 22,
wherein said polarization selecting interface of said second polarizing device is arranged:
to reflect and redirect said third secondary illumination light component of said secondary illumination light or a derivative thereof in said s-polarized polarization state as light for said third partial image to be generated from said first surface of said second polarizing device to said third surface of said second polarizing device, or
to reflect and redirect said second tertiary illumination light component of said tertiary illumination light or a derivative thereof in said s-polarized polarization state as light of said second partial image generated from said second surface of said second polarizing device to said fourth surface of said second polarizing device.

24. The projector arrangement according to claim 22, wherein said polarization selecting interface of said second polarizing device is arranged:

to transmit said third tertiary illumination light component of said tertiary illumination light or a derivative thereof in said p-polarized polarization state as light of said third partial image generated from said third surface of said second polarizing device to said fourth surface of said second polarizing device, or to transmit said second secondary illumination light component of said secondary illumination light or a derivative thereof in said p-polarized polarization state as light for said second partial image to be generated from said first surface of said second polarizing device to said second surface of said second polarizing device.

25. The projector arrangement according to claim 1, wherein said first polarizing device and said second polarizing device are arranged to have said second surface of said first polarizing device and said first surface of said second polarizing device facing each other in the vicinity to each other or to have a connected optical path between them.

26. The projector arrangement according to claim 1, wherein said SSR comprises a wavelength selective polarizer (WSP), which is arranged adjacent or in the vicinity of said fourth surface of said second polarizing device:

to transmit said third tertiary illumination light component in said p-polarized polarization state, to transmit said second tertiary illumination light component in said s-polarized polarization state, and to block, reflect or absorb said off-light or waste light component in said p-polanzed polarization state.

27. The projector arrangement according to claim 1, wherein said SSR comprises an analyser (A), which is arranged adjacent or in the vicinity of said fourth surface of said first polarizing device:

to transmit said first tertiary illumination light component in said s-polarized polarization state, and to block, reflect or absorb said off-light or waste light component in said p-polarized polarization state.

* * * * *